United States Patent
Glanville

[15] 3,649,194
[45] Mar. 14, 1972

[54] STABILIZATION OF ACIDIFIED HYDROGEN PEROXIDE SOLUTIONS

[72] Inventor: James Oliver Glanville, Roanoke, Va.
[73] Assignee: FMC Corporation, New York, N.Y.
[22] Filed: Oct. 28, 1969
[21] Appl. No.: 871,938

[52] U.S. Cl. ........................................23/207.5
[51] Int. Cl. ..........................................C01b 15/02
[58] Field of Search ..........................23/207.5, 207

[56] References Cited

UNITED STATES PATENTS 2,624,655  1/1953  Greenspan..........................23/207.5

FOREIGN PATENTS OR APPLICATIONS 299,247  6/1917  Germany..........................23/207.5

*Primary Examiner*—Oscar R. Vertiz
*Assistant Examiner*—Hoke S. Miller
*Attorney*—Eugene G. Seems, Frank Ianno and Milton Zucker

[57] ABSTRACT

Metal cleaning and pickling solutions containing acidified hydrogen peroxide and ions of the metal being etched are stabilized against decomposition of the hydrogen peroxide at elevated temperatures by the addition of an organic hydroxy compound of the class consisting of phenol, paramethoxy phenol, allyl alcohol, crotyl alcohol, and cis-1,4-but-2-enediol.

3 Claims, No Drawings

3,649,194

STABILIZATION OF ACIDIFIED HYDROGEN PEROXIDE SOLUTIONS

FIELD OF THE INVENTION

This invention relates to the cleaning and pickling of metal with acidified aqueous hydrogen peroxide at elevated temperatures, and particularly to the treatment of such solutions to retard the decomposition of the hydrogen peroxide so that the cleaning solutions are comparatively stable.

DESCRIPTION OF THE PRIOR ART

Articles made of copper and copper alloys have generally been cleaned by pickling in aqueous sulfuric acid containing chromium trioxide or sodium dichromate. Such pickling baths produce rather serious waste disposal problems; since it is not economical to separate and recover the copper and chromium from the spent pickle liquors, and both metals are serious pollutants, their disposal is a major problem.

It has been recognized for many years that acidified aqueous hydrogen peroxide is a suitable pickle for copper and copper alloys. However, as metal is dissolved, the decomposition of the hydrogen peroxide is accelerated, particularly at the fairly high temperatures (50°–80° C.) used for pickling. Various attempts have been made to find additives which would retard this decomposition, and thereby prolong the life of the hydrogen peroxide sufficiently to make its use economically feasible. Among the materials suggested have been urea (German Pat. No. 1255443); lower fatty acids (British Pat. No. 1119969 and French Pat. No. 1468442), saturated aliphatic alcohols (French Pat. No. 1539960); and glycerin (U.S. Pat. No. 3,345,225).

However, none of these are sufficiently active in reducing decomposition to make the use of hydrogen peroxide commercially attractive, except under conditions where the waste disposal problem cannot be solved.

OBJECT OF THE INVENTION

This invention aims to provide stabilizers for acidified aqueous hydrogen peroxide solutions useful for pickling copper, copper alloys and other metals, particularly at elevated temperatures, which render the solutions sufficiently stable that they may be economically used to replace conventional etching solutions, and which are capable of being treated to recover copper economically and thereby simplify waste disposal.

SUMMARY OF THE INVENTION

I have found that the rate of decomposition of aqueous acidified solutions of hydrogen peroxide containing metal ions can be reduced from 5 to over 500 times, by the incorporation into the solution of from 1 to 10,000 parts per million of a stabilizer selected from an organic hydroxy compound of the group consisting of phenol, paramethoxy phenol, allyl alcohol, crotyl alcohol, and cis-1,4-but-2-ene-diol.

DETAILED DESCRIPTION OF THE INVENTION

A typical solution useful for the pickling of copper and its alloys will contain 5 to 15 percent of sulfuric acid and 0.1 to 10 percent hydrogen peroxide, most typically, about 10 percent sulfuric acid and 5 percent hydrogen peroxide. Such a solution, when heated to pickling temperatures of 50° to 80° C., will perform well until copper accumulates in the liquor. As the copper dissolves, the rate of decomposition of the hydrogen peroxide accelerates, so that it loses oxygen so rapidly that its replacement in the pickle liquor becomes uneconomical.

This decomposition can be controlled by adding a stabilizer. However, in order to get economic results, the rate of decomposition should be slowed as much as possible; thus reducing the decomposition rate by a factor of two or three is only palliative. A reduction by a factor of five is useful in special situations, and as higher ratios are obtained, results become more and more economic.

According to the invention, I add to a typical hydrogen peroxide pickling solution containing mineral acid, such as sulfuric from 1 to 10,000 parts per million, and preferably 100 to 500 parts per million, of an unsaturated organic hydroxy compound of the group consisting of phenol, paramethoxy phenol, allyl alcohol, crotyl alcohol, and cis-1,4-but-2-ene-diol, getting thereby measured reduction factors in the rate of decomposition of from about 20 to 600, where copper is the metal being pickled.

The invention is also useful in pickling solutions for other metals, such as iron and its alloys, aluminum and its alloys, etc. It is useful in connection with a variety of mineral acids, such as nitric, hydrochloric, and hydrofluoric. However, the reduction in decomposition rates varies with the combination of acid and metal. Whereas copper is a very active catalyst for the decomposition of hydrogen peroxide, iron, for example, is somewhat less active. Hence, while marked reductions are obtained, the rate ratios are much less dramatic in the case where the stabilizer solutions of this invention are used for pickling steel, for example.

Phenol is the preferred stabilizer, being somewhat more active than paramethoxy phenol and substantially more active than allyl alcohol, crotyl alcohol, and cis-1,4-but-2-ene-diol. Strangely enough, other substituted phenols and other vinyl-unsaturated alcohols which I have tested are either not stabilizers at all, have a very small effect, are insoluble, or are uneconomic.

As little as 1 part per million of phenol has a noticeable effect on the rate of decomposition of an aqueous sulfuric acid hydrogen peroxide solution containing dissolved copper. I prefer not to operate above 10,000 parts per million (1 percent) because at that concentration or higher, the stabilizer concentrations of the order of 100 to 500 p.p.m. are most desirable, since they give optimum stabilization without producing problems due to stabilizer concentration.

Obviously, the stabilizer can be added to the hydrogen peroxide used in making the cleaning solution, selecting amounts which will produce the desired concentration in the solution,—i.e., about 20 to 200,000 p.p.m. based on the hydrogen peroxide content of the solution, and most preferably 2,000 to 10,000 p.p.m.

SPECIFIC EXAMPLES OF THE INVENTION

In the examples which follow, the effect of the addition of stabilizer is shown on a mature pickling solution by preparing solutions containing metal ion, acid, and hydrogen peroxide, with and without stabilizer, and comparing the rate of decomposition of the solutions with and without stabilizer. Similar results are obtained in actual pickling, but decomposition rate comparisons are difficult because of variations in concentration caused by unequal pickling rates due to differences in metal surfaces. The examples are given by way of illustration, and are not intended to be limiting.

Example 1—Phenol at 275 p.p.m.

A cleaning solution was prepared by mixing 100 ml. of a stock solution containing 13.8 g. $CuSO_4 \cdot 5H_2O$ and 13.8 g. $H_2SO_4$ with 20 ml. of 35 percent hydrogen peroxide. When maintained at a temperature of 150° F. the solution evolved oxygen gas at the rate of 72 ml. per minute. When a similar solution was prepared but with the addition of 275 p.p.m. of phenol the rate at which oxygen was evolved was measured to be 0.12 ml. per minute, thus the phenol reduces the decomposition rate by a factor of 600.

Example 2—Phenol at 50 p.p.m.

A cleaning solution was prepared by mixing 100 ml. of a stock solution containing 13.8 g. $CuSO_4 \cdot 5H_2O$ and 13.8 g. $H_2SO_4$ with 20 ml. of 35 percent hydrogen peroxide, 50 p.p.m. of phenol was added and the solution maintained at 150° F. Oxygen gas was evolved at a rate of 0.58 ml. per minute or some 125 times more slowly than in the absence of the phenol.

Example 3—Phenol at 5 p.p.m.

A cleaning solution was prepared by mixing 100 ml. of a stock solution containing 13.8 g. of $CuSO_4 \cdot 5H_2O$ and 13.8 g.

of $H_2SO_4$ with 20 ml. of 35 percent hydrogen peroxide solution, 5 p.p.m. of phenol was added and the solution maintained at 150° F. Oxygen gas was evolved from the solution at a rate of 4.0 ml. per minute or some 18 times more slowly than in the absence of the phenol.

Example 4—Allyl Alcohol at 250 p.p.m.

A cleaning solution was prepared by mixing 100 ml. of a stock solution containing 13.8 g. of $CuSO_4 \cdot 5H_2O$ and 13.8 g. of $H_2SO_4$ with 20 ml. of 35 percent hydrogen peroxide, 250 p.p.m. of allyl alcohol was added and the solution maintained at 150° F. Oxygen gas was evolved at the rate of 2.5 ml. per minute or some 29 times more slowly than in the absence of the allyl alcohol.

Crotyl alcohol was substituted for allyl alcohol in this example, and gave somewhat poorer, but still acceptable, results.

Example 5—Cis-1,6-but-2-ene-diol at 250 p.p.m.

A cleaning solution was prepared by mixing 100 ml. of a stock solution containing 13.8 g. of $CuSO_4 \cdot 5H_2O$ and 13.8 g. of sulfuric acid with 20 ml. of 35 percent hydrogen peroxide, 250 p.p.m. of cis-but-2ene-1,4-diol was added and the solution maintained at 150° F., oxygen gas was evolved at a rate of 3.5 ml. per minute or some 20 times slower than in the absence of the cis-but-2-ene-1,4-diol.

Example 6—Paramethoxyphenol at 275 p.p.m.

A cleaning solution was prepared by mixing 100 ml. of a stock solution containing 13.8 g. of $CuSO_4 \cdot 5H_2O$ and 13.8 g. of $H_2SO_4$ with 20 ml. of 35 percent hydrogen peroxide, 275 p.p.m. of paramethoxyphenol was added and the solution maintained at a temperature of 150° F. Oxygen gas was evolved at a rate of 1.2 ml. per minute or some 60 times slower than in the absence of the paramethoxyphenol.

Example 7—Allyl Alcohol in Steel Cleaning Composition

A cleaning solution was prepared containing 11 percent nitric acid, 5 percent acetic acid, and 4 percent hydrogen peroxide, and was 0.25 molar in ferric nitrate, when maintained at 85° F. the solution evolved oxygen gas at the rate of 7 ml. per minute. When 0.1 percent of allyl alcohol was added to the solution the decomposition rate fell to 1.5 ml. per minute of evolved oxygen or some 5 times slower than in the absence of the allyl alcohol.

Example 8—Allyl Alcohol in Steel

A cleaning solution was prepared containing 11 percent nitric acid, 5 percent acetic acid, and 4 percent hydrogen peroxide, and was 0.25 molar in ferric nitrate; when maintained at 85° F. with added 0.5 percent allyl alcohol, oxygen gas was evolved at the rate of 0.9 ml. per minute or some eight times more slowly than in the absence of the allyl alcohol.

Example A for comparison

A cleaning solution was prepared by mixing 100 ml. of a stock solution containing 13.8 g. of $CuSO_4 \cdot 5H_2O$ and 13.8 g. of $H_2SO_4$ with 20 ml. of 35 percent hydrogen peroxide, 400 p.p.m. of metanitrophenol was added and the solution maintained at 150° F. Oxygen gas was evolved at the rate of 65 ml. per minute or approximately 1.1 times as slowly as in the absence of the metanitrophenol.

Example B for comparison

A cleaning solution was prepared by mixing 100 ml. of a stock solution containing 13.8 g. of $CuSO_4 \cdot 5H_2O$ and 13.8 g. of sulfuric acid with 20 ml. of 35 percent hydrogen peroxide, 350 p.p.m. of quinol was added and the solution maintained at 65° C. Oxygen gas was evolved at the rate of 70 ml. per minute, or at a rate essentially identical to that in the absence of quinol.

Obviously, the examples can be multiplied indefinitely without departing from the scope of the invention which is defined in the claims.

While it is clear that the present invention is useful in stabilizing metal cleaning and pickling solutions, it should be understood that the present invention is also useful in stabilizing other types of metal-containing hydrogen peroxide solutions. For example, the invention is useful in stabilizing hydrogen peroxide solutions used in etching metals, e.g., copper, and in minerals processing; this includes the purification of yellow cake (uranium concentrate) with $H_2O_2$ solutions and the separation of molybdenite from copper concentrate with $H_2O_2$ solutions as described in U.S. Pat. No. 3,137,649.

What is claimed is:

1. In the pickling of metals in aqueous acid pickling solutions containing from 0.1 to 10 percent of hydrogen peroxide and 5 to 15 percent of a mineral acid and in which operation the accumulation of metal in the amount of over 1 percent during the pickling operation accelerates the decomposition of the hydrogen peroxide, the improvement which comprises having present in the solution 1 to 10,000 parts per million based on solution weight of a stabilizing additive selected from the group consisting of phenol, paramethoxyphenol, allylalcohol, crotyl alcohol, and cis-1,4-but-2-ene-diol, whereby the decomposition of said hydrogen peroxide in said pickling solution is reduced by a factor of at least five times.

2. The method of claim 1, in which the stabilizer is phenol.

3. The method of claim 1, in which the stabilizer is present in a concentration between 100 and 500 parts per million.

* * * * *

UNITED STATES PATENT OFFICE
CERTIFICATE OF CORRECTION

Patent No. 3,649,194　　　　　　　Dated March 14, 1972

Inventor(s) James Oliver Glanville

It is certified that error appears in the above-identified patent and that said Letters Patent are hereby corrected as shown below:

Column 3, line 16, "Cis-1,6-" should read --Cis-1,4---.

Column 3, line 20, "but-2ene" should read --but-2-ene--.

Signed and sealed this 16th day of April 1974.

(SEAL)
Attest:

EDWARD M. FLETCHER, JR.　　　　　　C. MARSHALL DANN
Attesting Officer　　　　　　　　　Commissioner of Patents